United States Patent
Miller

(10) Patent No.: US 10,695,877 B1
(45) Date of Patent: Jun. 30, 2020

(54) WORKHOLDING SYSTEM USING QUARTER TURN DEVICE

(71) Applicant: Elijah Tooling, Inc., Denton, TX (US)

(72) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 310 days.

(21) Appl. No.: 15/883,991

(22) Filed: Jan. 30, 2018

Related U.S. Application Data

(60) Provisional application No. 62/452,164, filed on Jan. 30, 2017.

(51) Int. Cl.
    F16B 5/02    (2006.01)
    B23Q 1/01    (2006.01)
    B23C 9/00    (2006.01)

(52) U.S. Cl.
    CPC ............. B23Q 1/015 (2013.01); B23C 9/00 (2013.01); B23C 2240/24 (2013.01); F16B 5/02 (2013.01); F16B 5/0208 (2013.01)

(58) Field of Classification Search
    CPC ....... B23Q 1/015; B23C 9/00; B23C 2240/24; F16B 5/0208; F16B 5/10; F16B 21/02; F16B 21/06; F16B 5/02
    USPC .................. 411/347, 352, 353, 552
    See application file for complete search history.

(56) References Cited

U.S. PATENT DOCUMENTS

| | | | | |
|---|---|---|---|---|
| 3,510,922 A * | 5/1970 | Dzus | ............ | F16B 5/10 411/555 |
| 4,616,967 A * | 10/1986 | Molina | .......... | F16B 41/002 411/105 |
| 6,095,736 A * | 8/2000 | Miller | .......... | F16B 41/002 411/107 |
| 6,296,431 B1 * | 10/2001 | Miller | .......... | F16B 5/0208 411/107 |
| 8,087,861 B2 * | 1/2012 | Wang | .......... | B23K 1/0008 411/107 |
| 8,770,902 B1 * | 7/2014 | Miller | .......... | F16B 5/0208 29/451 |
| 8,939,691 B2 * | 1/2015 | Tseng | .......... | F16B 21/04 411/347 |
| 2009/0202319 A1 * | 8/2009 | Wang | .......... | F16B 5/0208 411/353 |
| 2011/0045915 A1 * | 2/2011 | Wang | .......... | B21H 3/06 470/10 |
| 2011/0070049 A1 * | 3/2011 | Wang | .......... | F16B 5/0208 411/372.6 |
| 2012/0224935 A1 * | 9/2012 | Chiu | .......... | F16B 5/0266 411/352 |

* cited by examiner

*Primary Examiner* — Roberta S Delisle
(74) *Attorney, Agent, or Firm* — James E. Walton

(57) ABSTRACT

A workholding system includes a quarter turn fastener used in workholding applications to quickly hold and release objects, such as tooling, parts, and plates. In one embodiment, a T-slot fastener facilitates the creation of an entire workholding system that facilitates the rapid installation of studs into receiving members. The compact design also makes possible the ability to insert the quarter turn fastener into a device that can fit into a T-slot and still have considerable holding power. The system is lower in cost than other solutions.

1 Claim, 23 Drawing Sheets

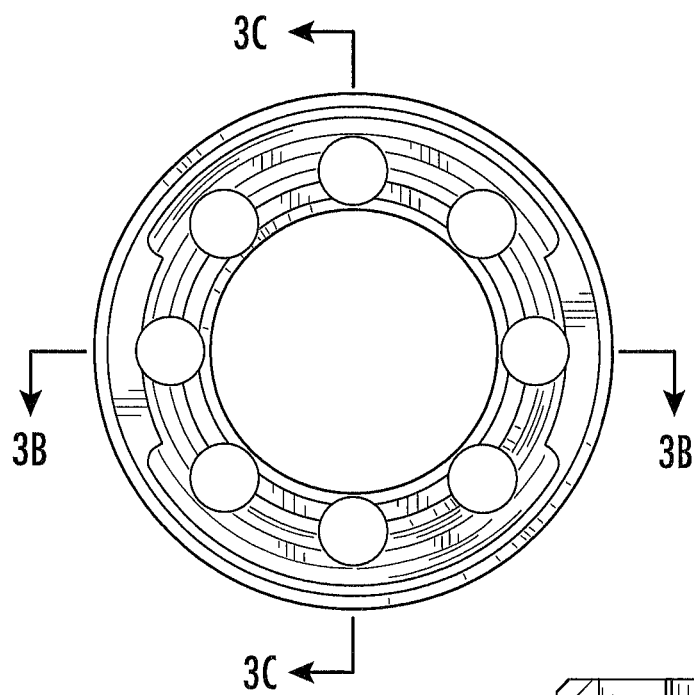
FIG. 3A
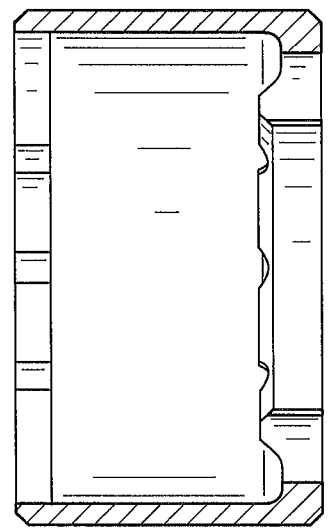
FIG. 3C
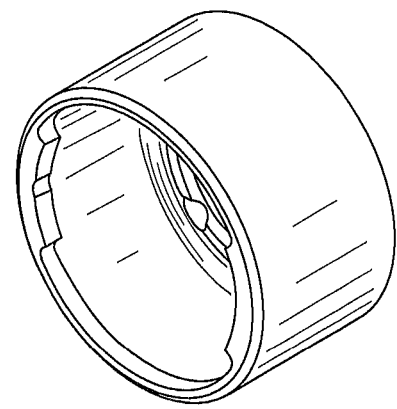
FIG. 3B
FIG. 3D

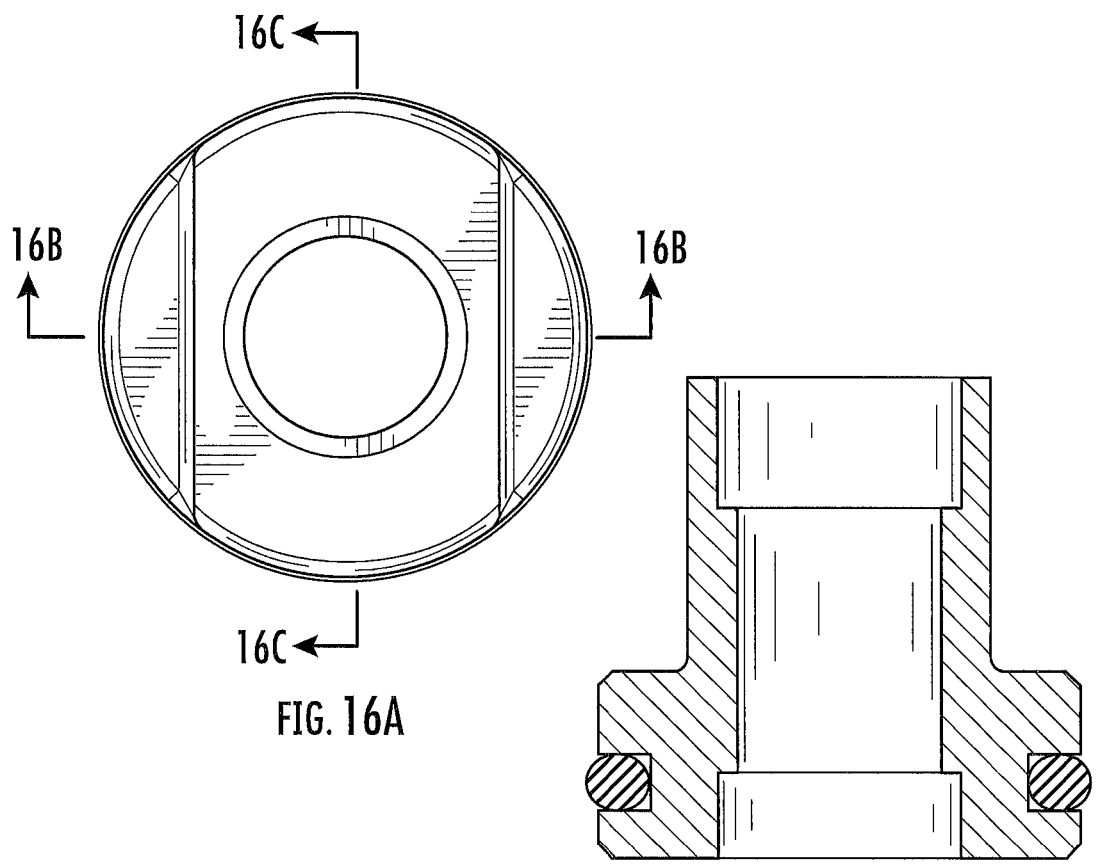
FIG. 16A
FIG. 16B
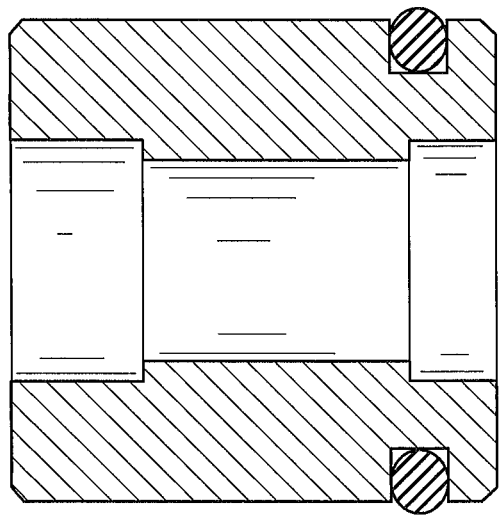
FIG. 16C
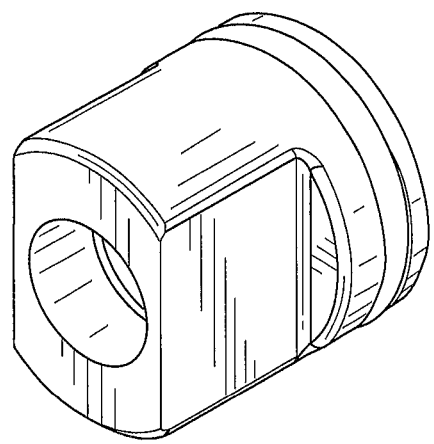
FIG. 16D

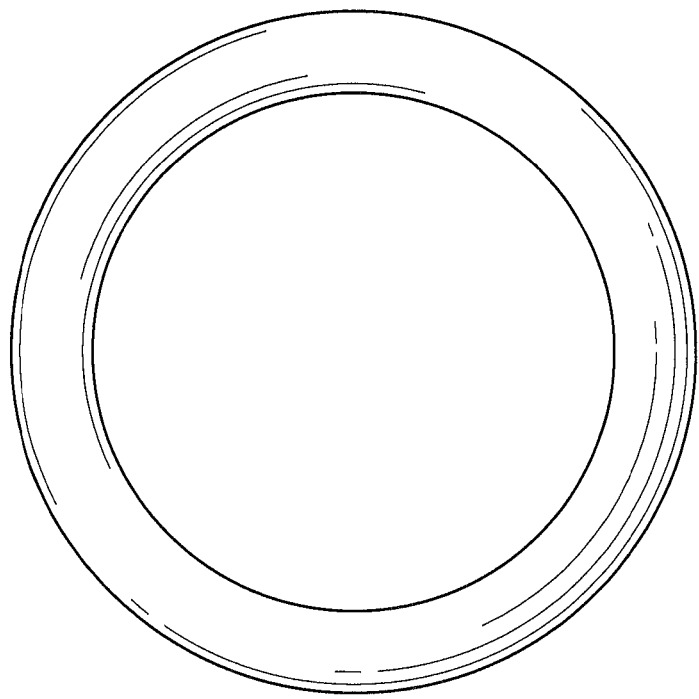 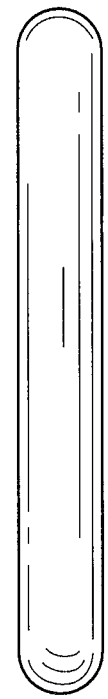
FIG. 17A    FIG. 17B
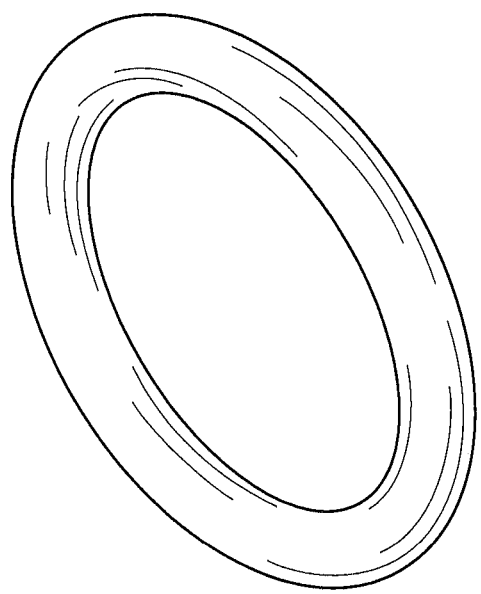
FIG. 17C

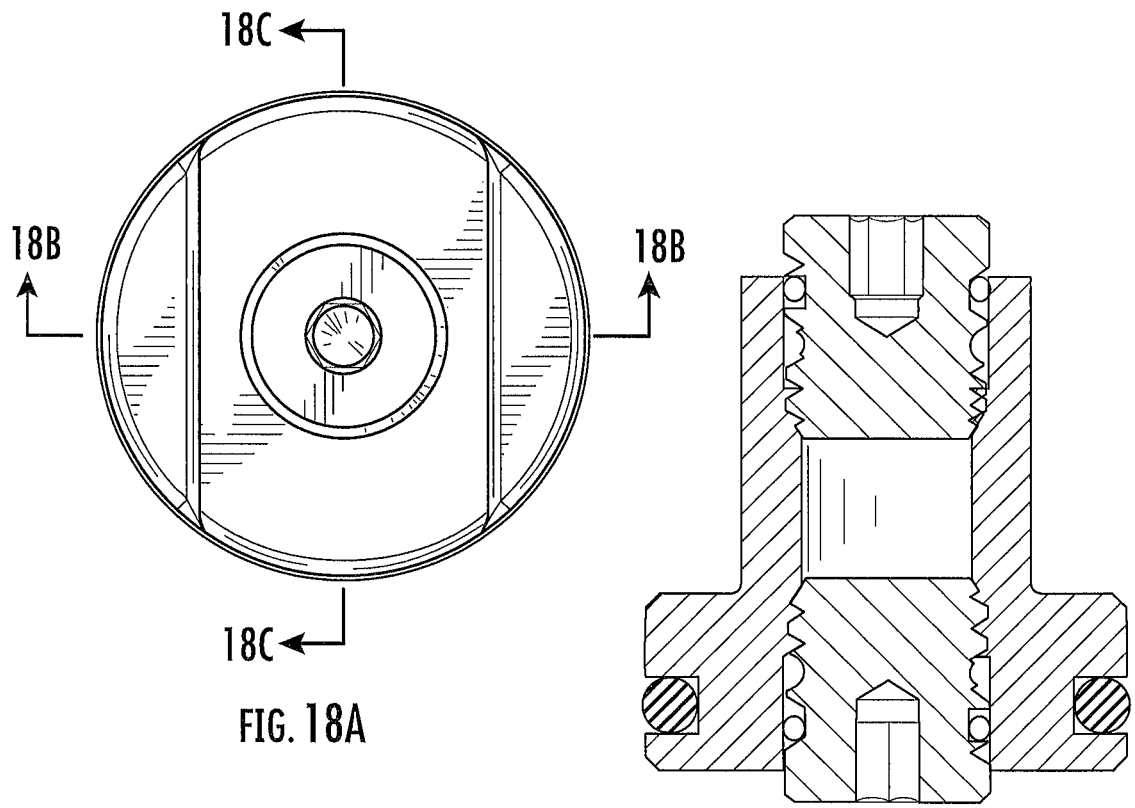
FIG. 18A
FIG. 18B
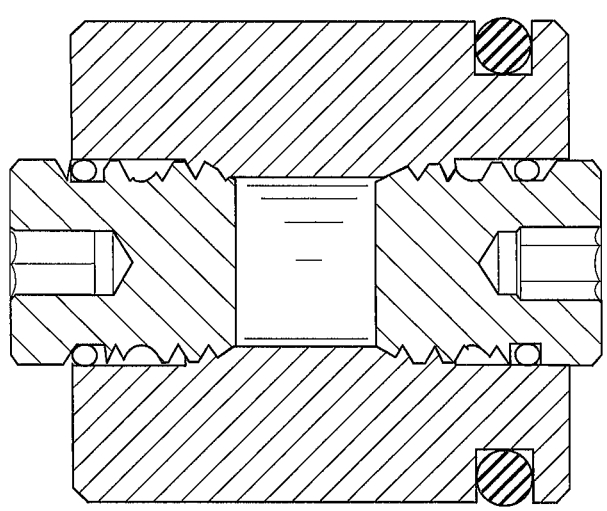
FIG. 18C
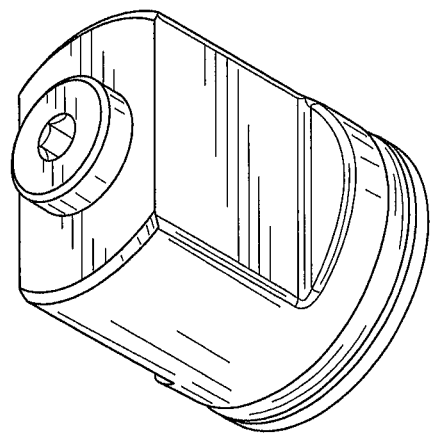
FIG. 18D

WORKHOLDING SYSTEM USING QUARTER TURN DEVICE

This application claims the benefit of U.S. Provisional Application No. 62/452,164, filed 30 Jan. 2017, titled "Workholding System Using Quarter Turn Device," which is incorporated herein for all purposes.

BACKGROUND

1. Field of the Invention

The present application relates to milling machines that incorporate T-Slot baseplate fixtures.

2. Description of the Related Art

Most milling machines incorporate a T-slot baseplate fixture. This fixture is considered "sacrosanct" and is rarely used for anything but attaching vises by way of bolts and T-slot nuts. If it is used, it locates and holds another fixture, often called a sub-plate fixture.

Although there have been great advances in the area of T-slot baseplate fixtures for milling machines, considerable shortcomings remain.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the following accompanying drawings.

FIGS. 1A-7D—Depict a fastener device used to releasably fasten a first object and a second object.

FIG. 1A—Depicts the housing in the top view where holes in the face are used to screw/drive the housing into the first object. Although the drive holes are the preferred embodiment, there are other options available for installing the housing.

FIG. 3A—Depicts the release inset in top view. In this view the tangs that engage the stud and also release the stud, based upon the stud's position, can be seen. Also, the holes in the base of the release inset can be seen. These holes facilitate the flow of liquids/debris through the fastener.

FIG. 3B—Depicts the release inset in section view. Here it can be observed that there is a raised area that captures the spring. Although preferred, this raised area is not necessary to the functioning of the device.

FIG. 3C—Depicts the release inset in trimetric view. The walls and floor of the release inset are shown as thin in this depiction, but they can be any width that facilitates the function of the fastener.

FIG. 3D—Depicts the release inset in trimetric view.

FIG. 7D—Depicts the assembled fastener in trimetric view.

FIGS. 8A-13D—Depicts a different embodiment of the fastening device (referred to as a T-Slot fastener) described by FIGS. 1A-7D, with a housing definition that does not include outer threads. This device is specifically used such that the first object is a T-slot wherever they may be incorporated. This device and devices with similar outside housings form the basis of the work-holding system that later described by this application.

FIG. 8A—Depicts the housing in top view. The preferred embodiment incorporates a circular outside diameter, but there are other shapes that may be used.

FIG. 13D—Depicts the assembled fastener in trimetric view.

FIG. 14A—Depicts the modular T-slot fixture in top view.

FIG. 14B—Depicts the modular T-slot fixture in side view.

FIG. 14C—Depicts the modular T-slot fixture in section view. Here it can be observed that the slots are at specific distances from each other forming a continuous pattern of slots. In the base of the slot is a bored (precise) circular countersink that is manufactured such that it is precisely related to every other hole in the slot as well as the holes that are adjacent to it in the raised portion of the T-slot. This counter-bore, when used in conjunction with a locator from FIGS. 18A-18D will precisely locate a second object to the first object (FIGS. 18A-18D locator).

FIG. 14D—Depicts the modular T-slot fixture in section view. Here it can be observed that there are combination holes consisting of a bored (precise diameter) counterbore plus threaded portion below. This hole, referred to as a multi-purpose hole, serve as a means to locate and hold using screws, dowels, retractable dowels, shoulder screws, supports, and other locating/holding objects. The bore plus insert is a preferred embodiment, but can be replaced/ substituted with hardened inserts, such as precision threaded locator bushings, bushings, threaded inserts, helicoil inserts and similar.

FIG. 14E—Depicts the modular T-slot fixture in trimetric view. Any combination of lower countersunk holes+upper multi-purpose holes can be used, with the consideration that they are all precisely located to each other and specific, precise distances apart, in a grid type pattern. In addition, there is a precisely width slot in the top of the T-slot riser that facilitates use of special use, modular vises, that can benefit from the T-slot modular fixture, being held by the T-slot fastener, and located by the retractable dowel pins in the base of the vise, with the precise slot feature.

FIGS. 15A-18D—Depict a novel locating device (T-slot locator) that consists of a modified housing from FIGS. 13A-13D in which the internal features are now adapted to accept retractable dowel pins. The preferred embodiment of the housing incorporate flats to remove the O-ring, but may also exclude them. The retractable dowel pin in the base can be raised and lowered, such that it can be in use, or not. When lowered the retractable dowel pin engages and locates with the counter-bore in the T-slot fixture. Due to the close concentricity in the housing this location is then made available to the top retractable dowel pin, which in turn locates the second object. When lowering the base retractable dowel pin the housing is biased against the T-slot fixture, holding the T-slot fastener in place.

FIGS. 15A, 15B, 15C—Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.

FIG. 16A—Depicts the housing in top view. The preferred embodiment incorporates a circular outside diameter, but there are other shapes that may be used.

FIG. 16B—Depicts the housing in section view. Here it can be observed that the housing incorporates precise counterbores in both ends and a threaded portion between them. The counter-bores are held coincident to each other such that the location of the lower retractable dowel pin is translated to the top retractable dowel pin. The housing sectional shape conforms (male to female) to the shape of the T-slot.

FIG. 16C—Depicts the housing in section view.

FIG. 16D—Depicts the housing in trimetric view.

FIGS. 17A, 17B, 17C—Depict the O-ring in different views. The O-ring is a preferred embodiment, used to create friction in the slot. There are specific features of the housing (flats) that are incorporated to make the O-ring optional by removal. When the O-ring is removed, the fastener slides easily in the slot, which is a desirable characteristic, at times.

FIG. 18A—Depicts the assembled T-slot locator in top view.

FIG. 18B—Depicts the assembled T-slot locator in section view.

FIG. 18C—Depicts the assembled T-slot locator in section view.

FIG. 18D—Depicts the assembled T-slot locator in trimetric view.

FIGS. 19A-21D—Depict a novel locating device (T-slot locator slider) that consists of a biasing member and a retractable dowel pin. The preferred embodiment of the biasing member will fit the width of the accepting T-slot and supply a radii that matches the outer diameter of the T-slot fastener. The purpose of this device is to precisely locate the T-slot fastener by engaging the locating counter-bored holes in the base of the T-slot. Like the T-slot locator, this devise incorporates a precise counter-bore and thread combination to facilitate the use of a retractable dowel pin. When lowering the retractable dowel pin, the biasing member is moved against the T-slot fixture, holding the T-Slot locator firmly in place. This is not the only embodiment which can serve this purpose. For example, there could be two radii locating surfaces that would facilitate locating two T-slot fasteners at the same time.

FIG. 19A—Depicts the biasing member in the top view.

FIG. 21C—Depicts the assembled T-slot locator slider in section view.

FIG. 21D—Depicts the assembled T-slot locator slider in trimetric view.

FIG. 22A—Depicts the assembled T-slot locator application in top view.

FIG. 22B—Depicts the assembled T-slot locator application in side view.

FIG. 22C—Depicts the assembled modular T-slot fixture application in section view. Several features of this novel concept are visible in this view. The magnified views (FIG. 22D, FIG. 22E) are even more descriptive. Shown here is the representation of several of these products in use: The T-slot fastener, the T-slot locator, and the retractable dowel pins in the upper slots.

FIG. 22D—Depicts the assembled T-slot locator application in magnified section view.

FIG. 22E—Depicts the assembled T-slot locator application in magnified section view.

FIG. 22F—Depicts the assembled T-slot locator application in trimetric view.

FIGS. 23A, 23B, 23C, 23D, 22E—Depict the assembled modular T-slot fixture incorporating the T-slot fastener and T-slot locator to locate/hold a vise product—Top View. This particular application facilitates the ability to rapidly, repeatably quick-change specialized modular vises that require the slot in the top of the fixture, on/off the T-slot fixture.

FIG. 23A—Depicts the assembled T-slot locator application in top view.

FIG. 23B—Depicts the assembled T-slot locator application in side view.

FIG. 23C—Depicts the assembled modular T-slot fixture application in section view.

FIG. 23D—Depicts the assembled modular T-slot fixture application in section view.

FIG. 23E—Depicts the assembled T-slot locator application in trimetric view.

Figure 1A:
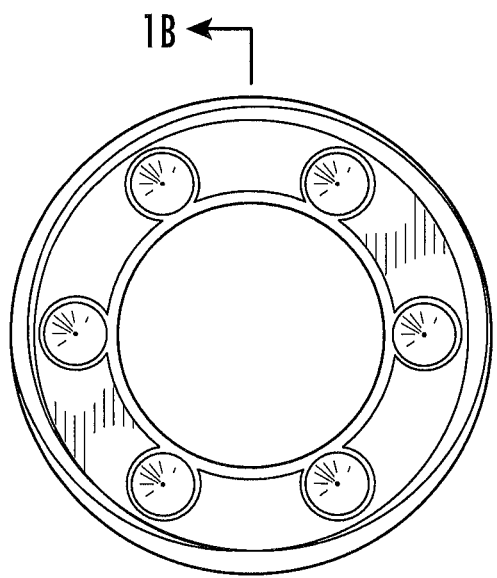
Figure 1B:
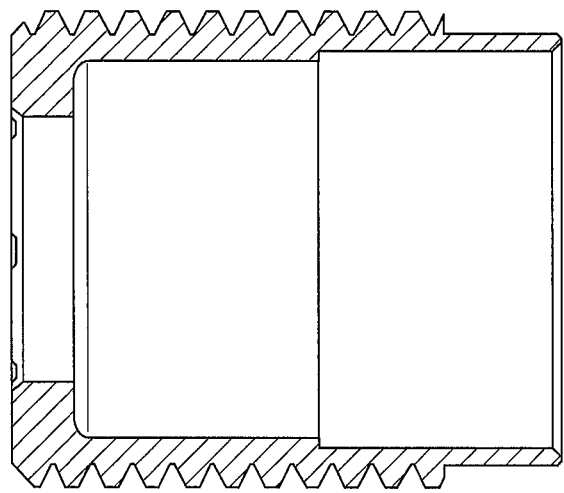
FIG. 1B—Depicts the housing as a section view where its outer threads can be seen, its inner compartment to house the stud, spring, and release insert. Also shown is the shoulder that captures the stud and prevents it from exiting the housing when engaged.
Figure 1C:
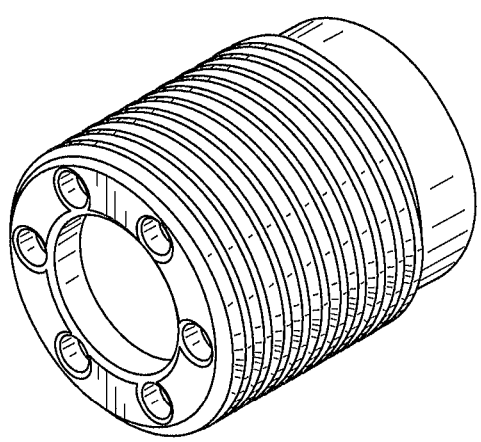
FIG. 1C—Depicts the housing in trimetric view.
Figure 2A:
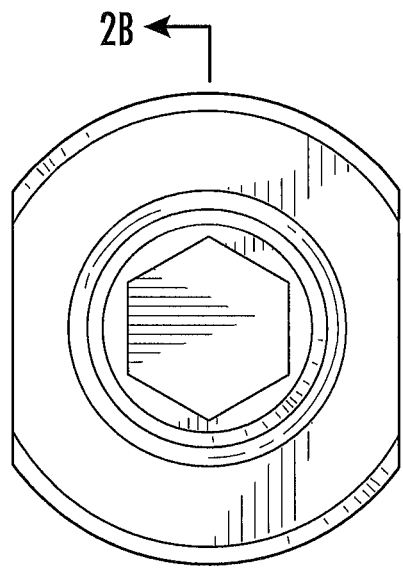
FIG. 2A—Depicts the stud in top view. Although the hex shown is a preferred embodiment, there are other methods available to drive it. Also, the hex can be incorporated in one end, both ends, or the other end.
Figure 2B:
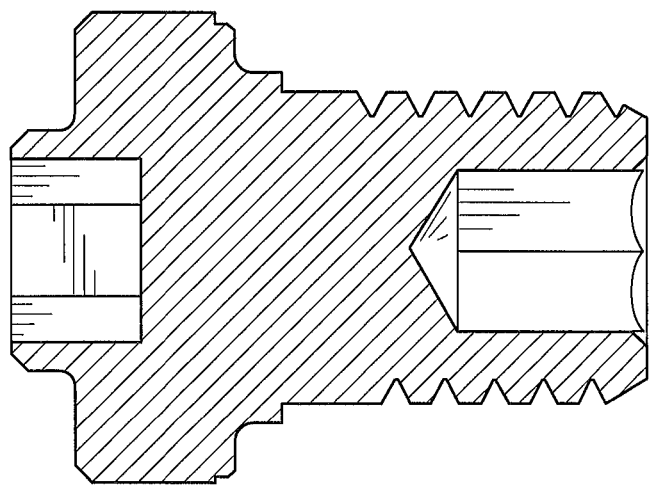
FIG. 2B—Depicts the stud in section view which shows the tangs that engage/dis-engage the release insert as well as the shoulder which is stopped by the housing shoulder. The threads are used to fasten the second object. Although the threads are the preferred embodiment, there are other methods by which the stud can engage/hold the second object.
Figure 2C:
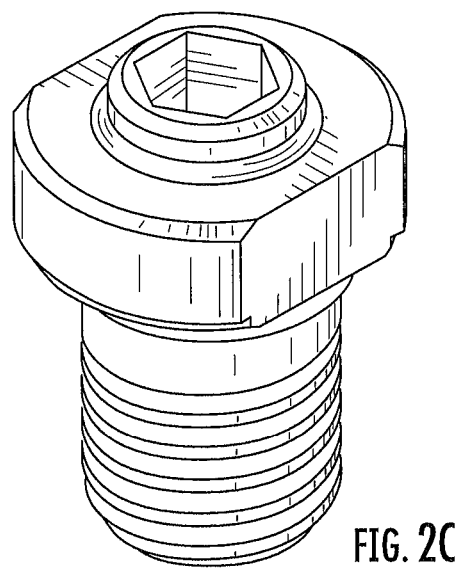
FIG. 2C—Depicts the stud in trimetric view.
Figure 4A:
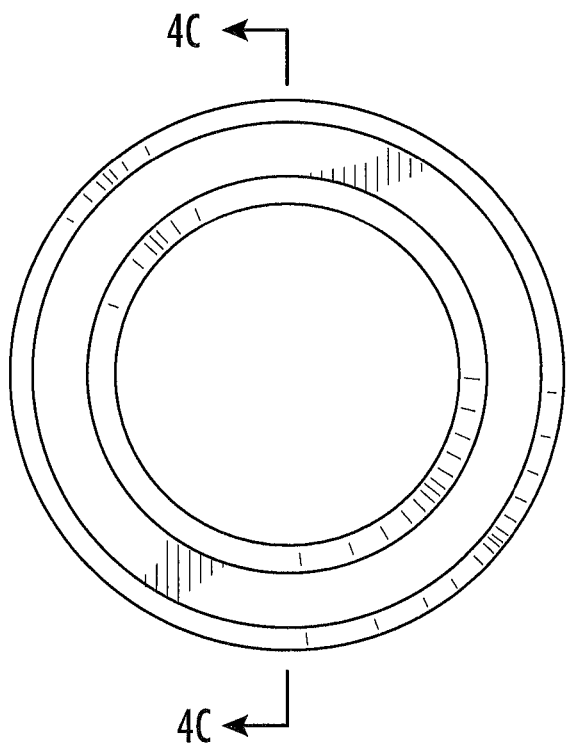
FIG. 4A—Depicts the wiper in top view. The wiper is a metal/plastic device that works to prevent debris entering into the fastener. The inner diameter of the wiper almost touches the threads of the stud acting as a device that wipes the studs. The outer diameter of the wiper fits the inner diameter of the housing. The wiper in held in place by the capture inset. The use of the wiper is a preferred embodiment, but unnecessary to the function of fastening the first object to the second object.
Figure 4B:
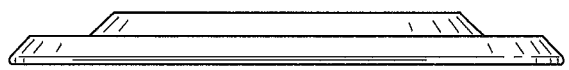
FIG. 4B—Depicts the wiper in side view.
Figure 4C:
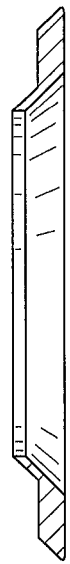
FIG. 4C—Depicts the wiper in section view where the metal and plastic components can be seen.
Figure 5A:
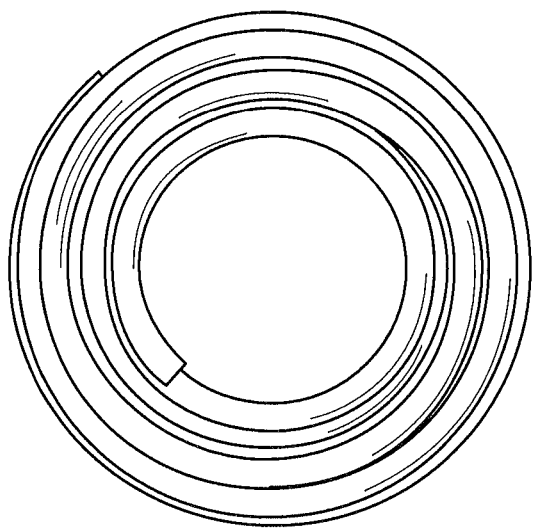
FIG. 5A—Depicts the spring in top view. This spring is the preferred embodiment since it compresses to an almost flat condition, and is used to bias the stud up and out of the housing. Other spring configurations can also be used, depending upon the configuration of the release inset, housing and stud.
Figure 5B:
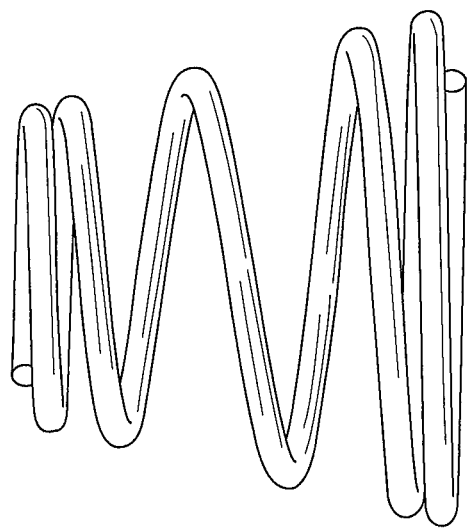
FIG. 5B—Depicts the spring in side view.
Figure 5C:
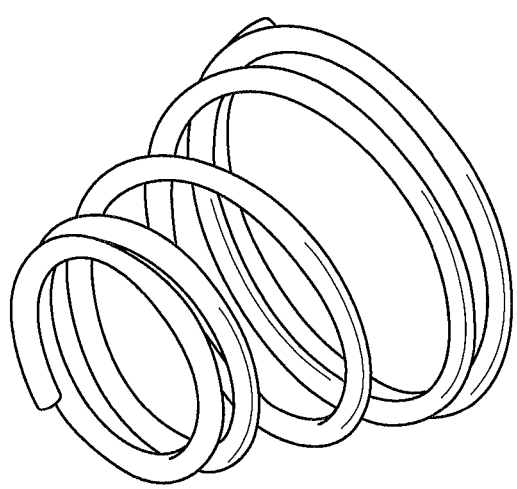
FIG. 5C—Depicts the spring in trimetric view.
Figure 6A:
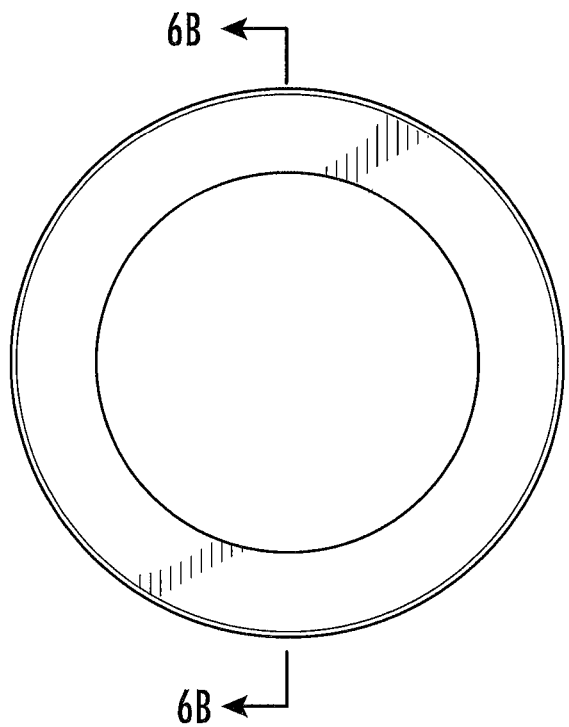
FIG. 6A—Depicts the capture inset in top view.
Figure 6B:
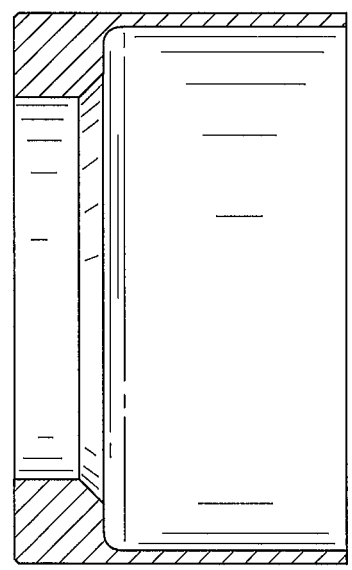
FIG. 6B—Depicts the capture inset in section view. Here it can be seen that if used, the inside diameter of the capture inset serves as the shoulder that prevents the stud from exiting the housing. The top face of the capture inset presses against the wiper, holding it in place.
Figure 6C:
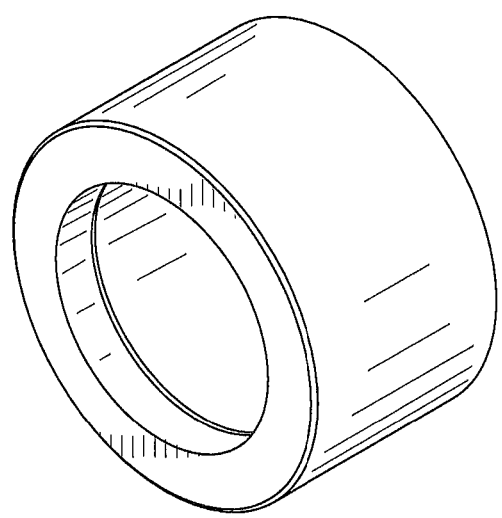
FIG. 6C—Depicts the capture inset in trimetric view.
Figure 7A:
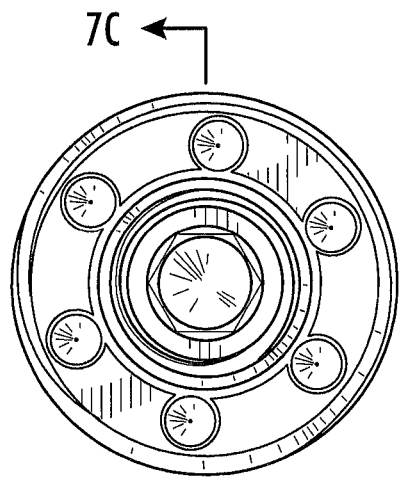
FIG. 7A—Depicts the assembled fastener in top view.
Figure 7B:
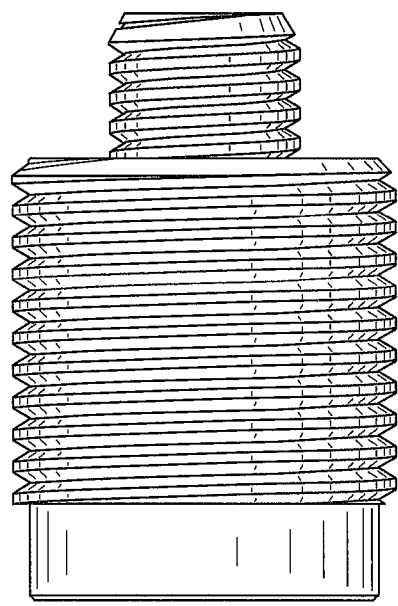
FIG. 7B—Depicts the assembled fastener in side view.
Figure 7C:
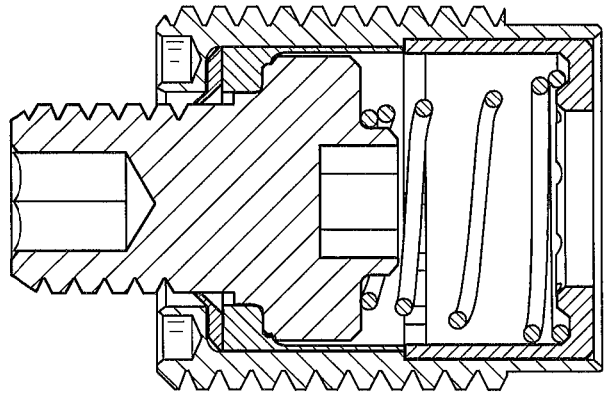
FIG. 7C—Depicts the assembled fastener in section view.
Figure 7D:
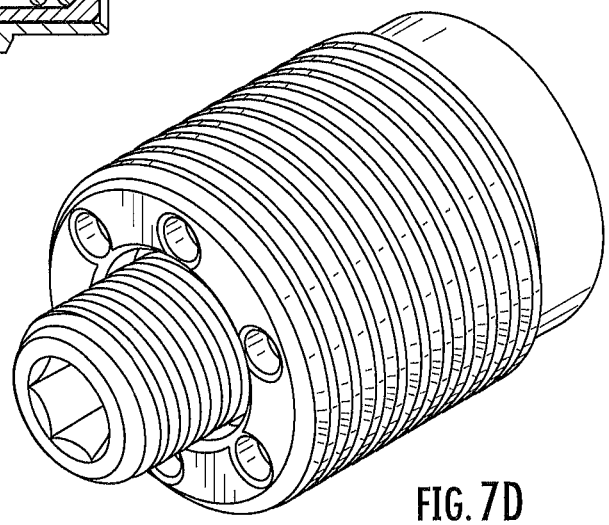
Figure 8A:
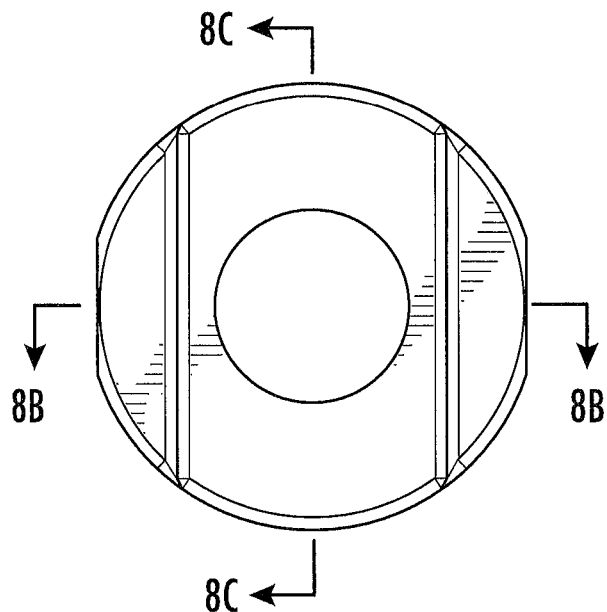
Figure 8B:
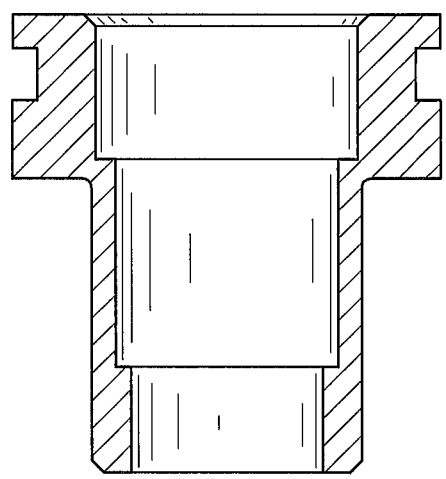
FIG. 8B—Depicts the housing in section view. Here it can be observed that the housing incorporates similar internal features to the housing of FIGS. 1A-1C, in addition to a grooved slot. The housing sectional shape conforms (male to female) to the shape of the T-slot.
Figure 8C:
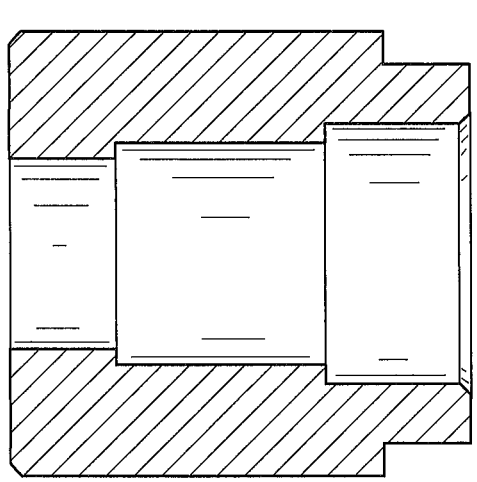
FIG. 8C—Depicts the housing in section view. Here it can be observed that flats are incorporated into the housing base so as to facilitate removing the O-ring.
Figure 8D:
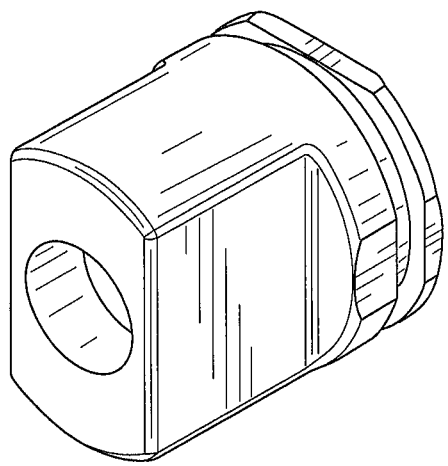
FIG. 8D—Depicts the housing in trimetric view and the flats are clearly visible.
Figure 9A:
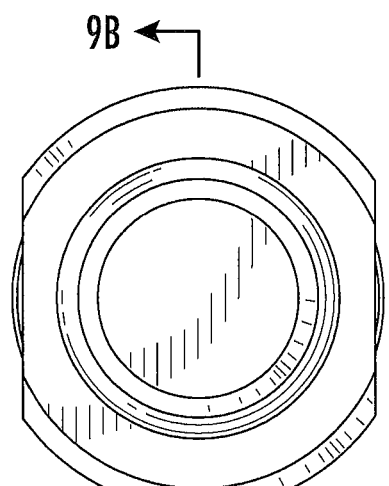
FIG. 9A—Depicts the stud in top view.
Figure 9B:
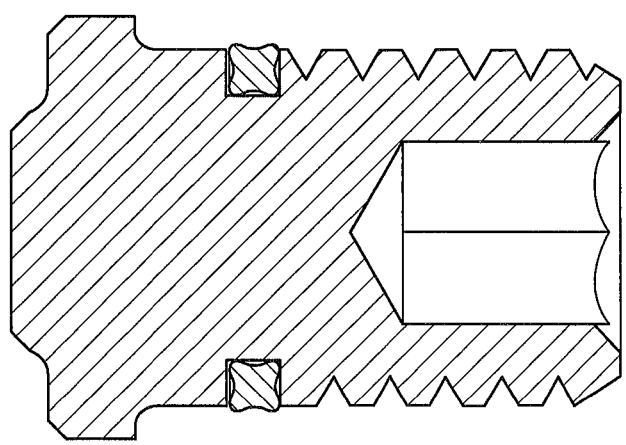
FIG. 9B—Depicts the stud in section view which shows the tangs that engage/dis-engage the release inset as well as the shoulder which is stopped by the housing shoulder. The threads are used to fasten the second object. Although the threads are the preferred embodiment, there are other methods by which the stud can engage/hold the second object. It can also be observed in this view that there is a square O-ring that is used to prevent debris from entering the housing. The shape of the O-ring and its very usage are preferred embodiments but can be optional or different.
Figure 9C:
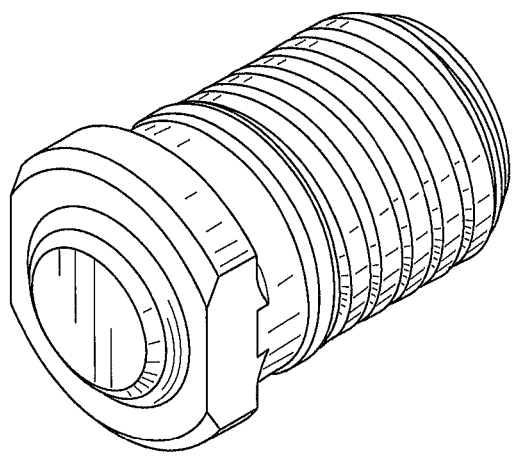
FIG. 9C—Depicts the stud in trimetric view.
Figure 10A:
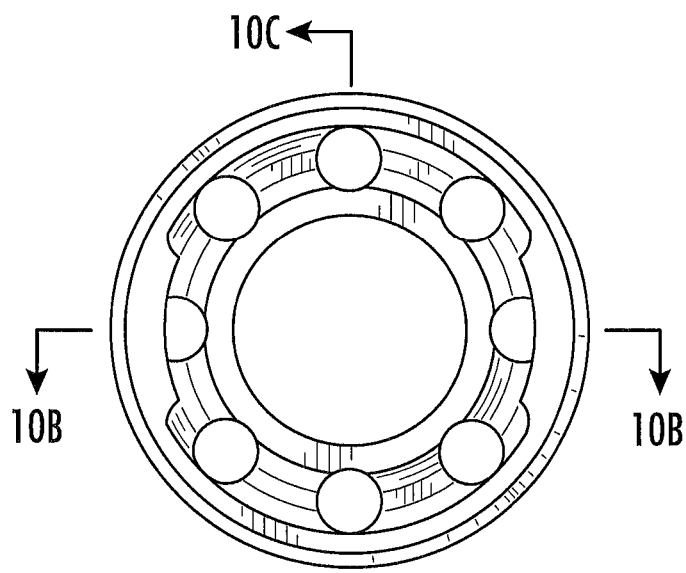
FIG. 10A—Depicts the release inset in top view. In this view the tangs that engage the stud and also release the stud, based upon the stud's position, can be seen. Also, the holes in the base of the release inset can be seen. These holes facilitate the flow of liquids/debris through the fastener.
Figure 10B:
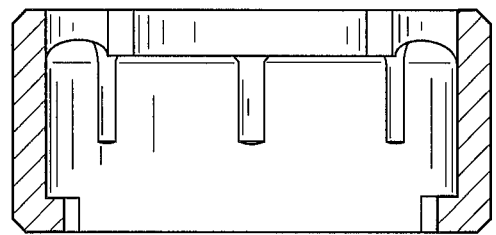
FIG. 10B—Depicts the release inset in section view. Here it can be observed that there is a raised area that captures the spring. Although preferred, this raised area is not necessary to the functioning of the device.
Figure 10C:
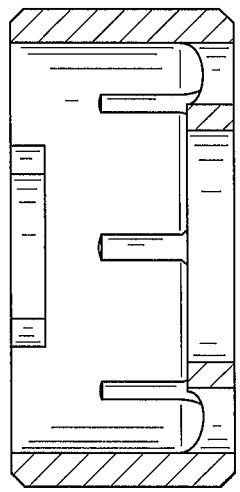
FIG. 10C—Depicts the release inset in trimetric view. The walls and floor of the release inset are shown as thin in this depiction, but they can be any width that facilitates the function of the fastener.
Figure 10D:
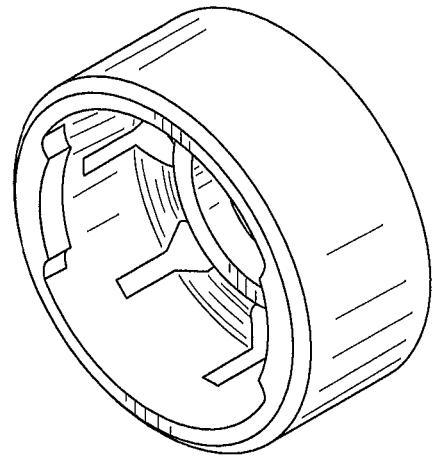
FIG. 10D—Depicts the release inset in trimetric view.
Figure 11A:
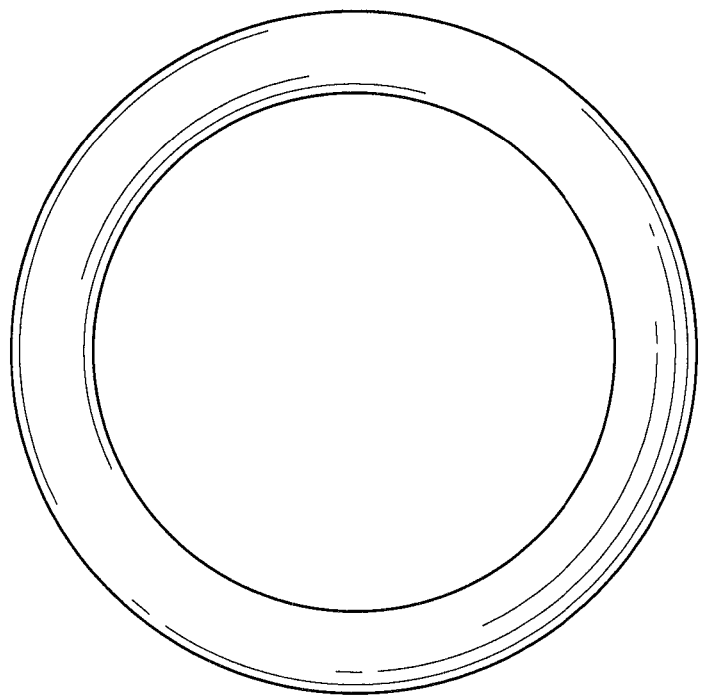
FIGS. 11A, 11B, 11C—Depict the O-ring in different views. The O-ring is a preferred embodiment, used to create friction in the slot. There are specific features of the housing (flats) that are incorporated to make the O-ring optional by removal. When the O-ring is removed, the fastener slides easily in the slot, which is a desirable characteristic, at times.
Figure 11B:
Figure 11C:
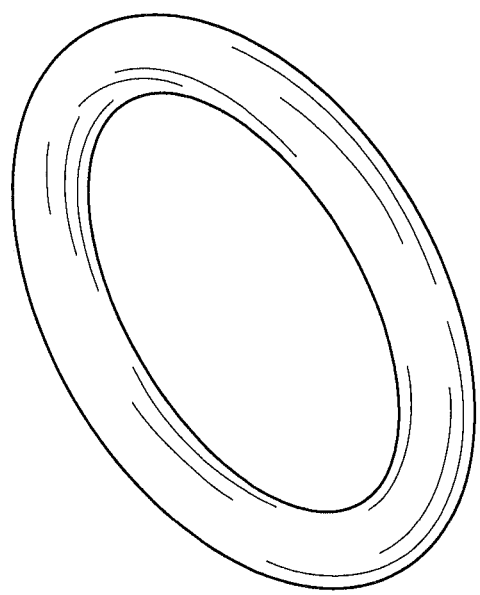
Figure 12A:
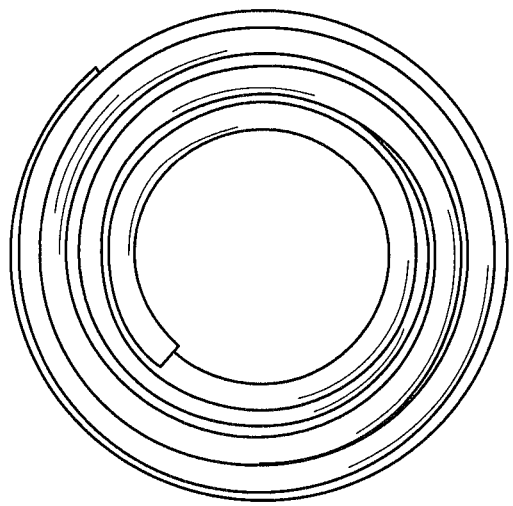
FIG. 12A—Depicts the spring in top view. This spring is the preferred embodiment since it compresses to an almost flat condition, and is used to bias the stud up and out of the housing. Other spring configurations can also be used, depending upon the configuration of the release inset, housing and stud.
Figure 12B:
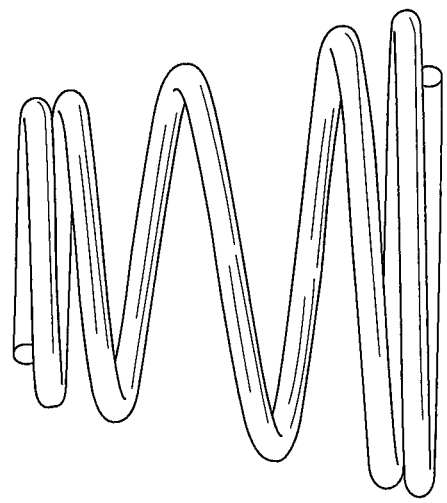
FIG. 12B—Depicts the spring in side view.
Figure 12C:
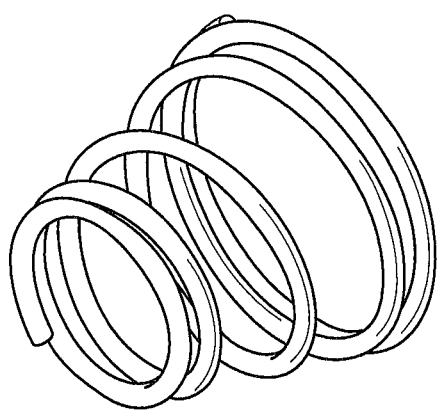
FIG. 12C—Depicts the spring in trimetric view.
Figure 13A:
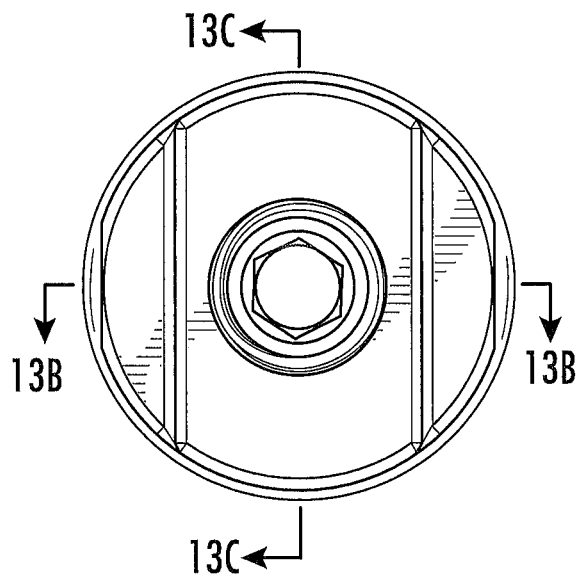
FIG. 13A—Depicts the assembled fastener in top view.
Figure 13B:
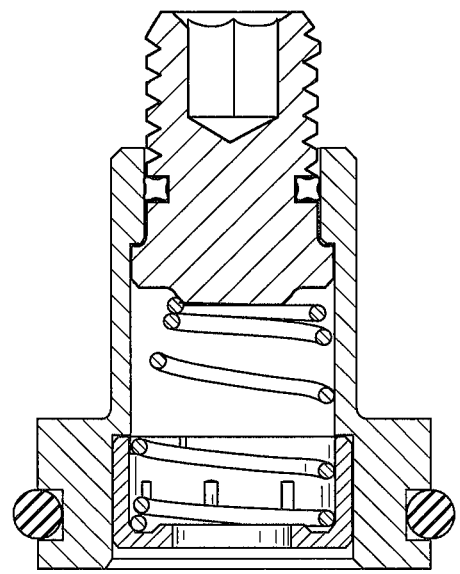
FIG. 13B—Depicts the assembled fastener in section view.
Figure 13C:
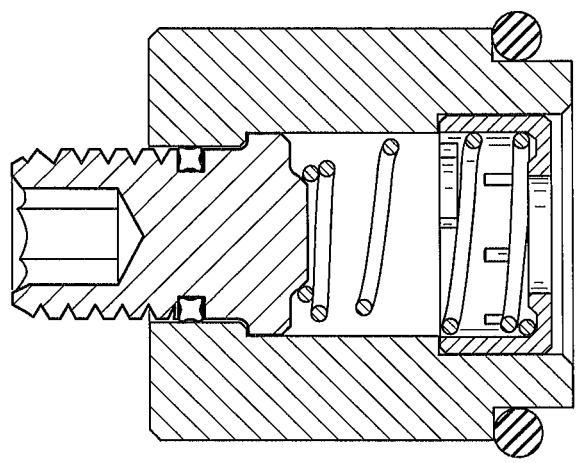
FIG. 13C—Depicts the assembled fastener in section view.
Figure 13D:
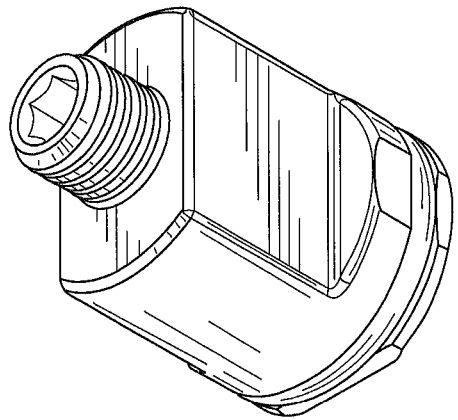
Figure 14E:
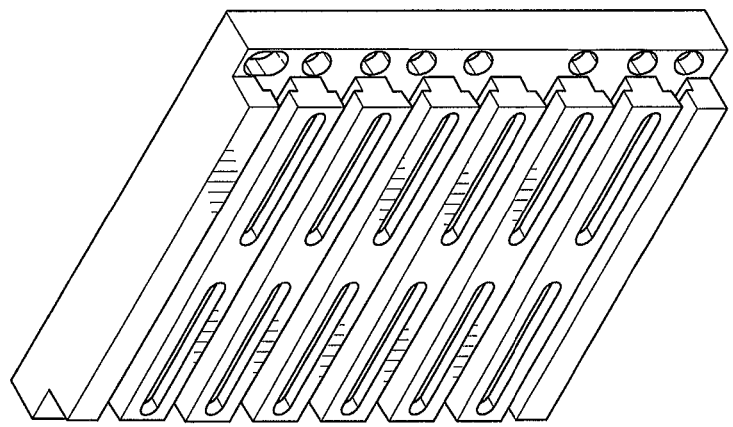
FIGS. 14A, 14B, 14C, 14D, 14E—Depict a T-slot type fixture with specific, modular characteristics, that when used in combination with FIGS. 13A-13D type fasteners and FIGS. 18A-18D type locators, can accurately and precisely locate as well as hold objects.
Figure 14C:
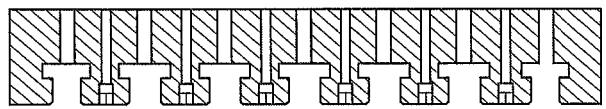
Figure 14A:
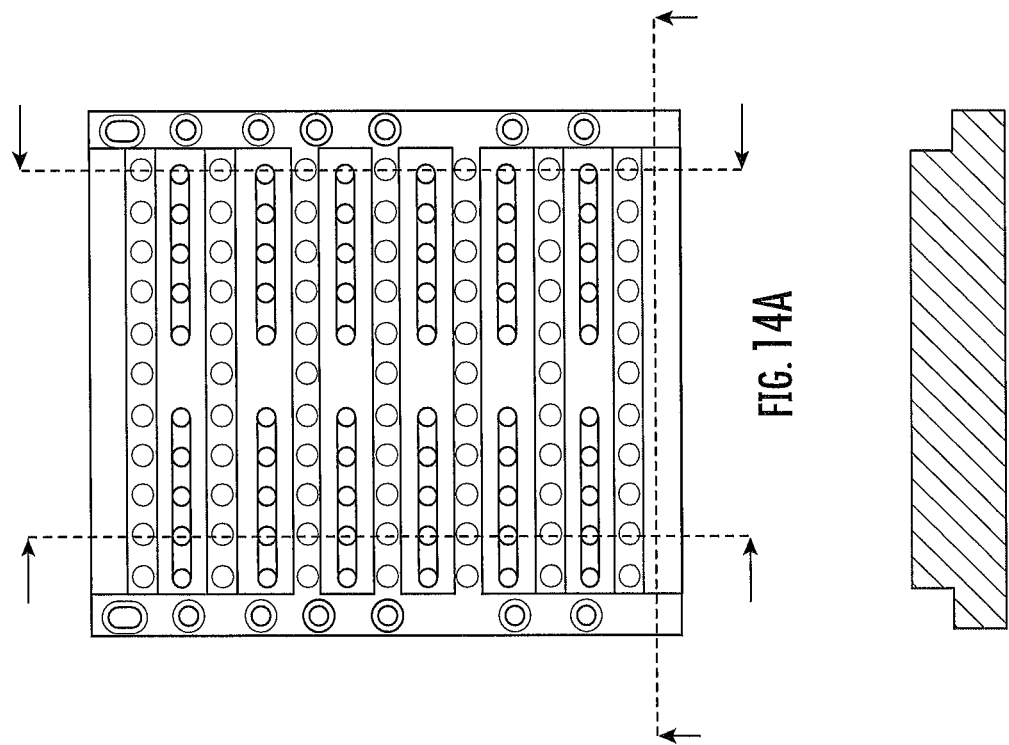
Figure 14B:
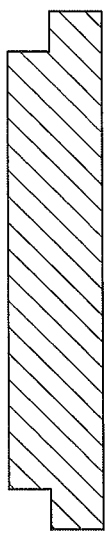
Figure 14D:
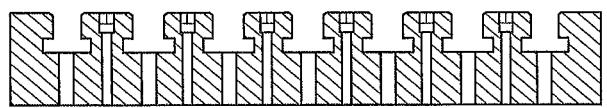
Figure 15A:
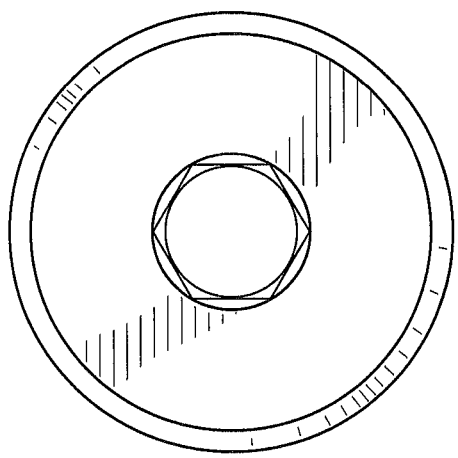
Figure 15B:
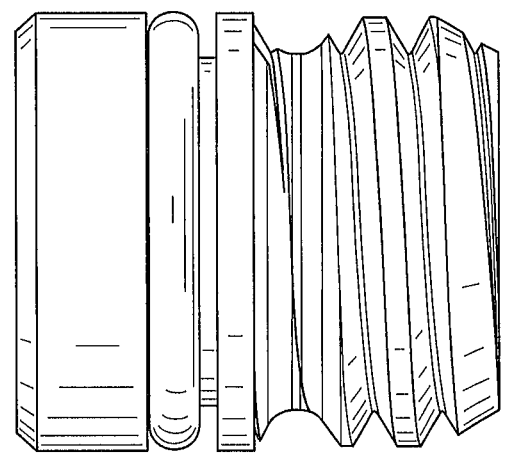
Figure 15C:
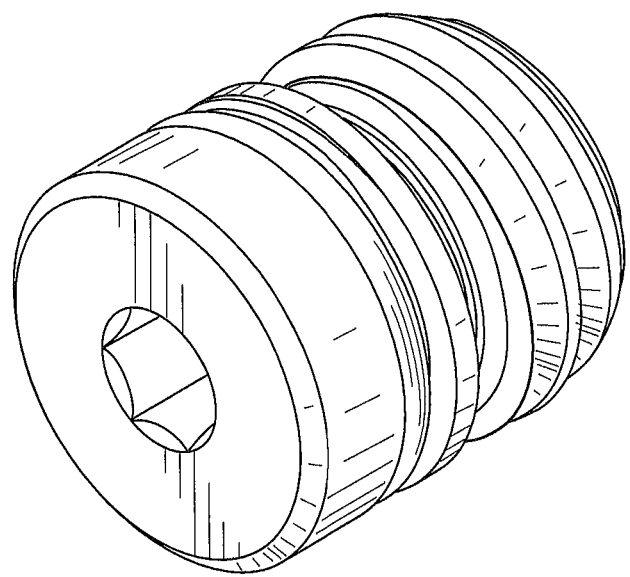
Figure 19A:
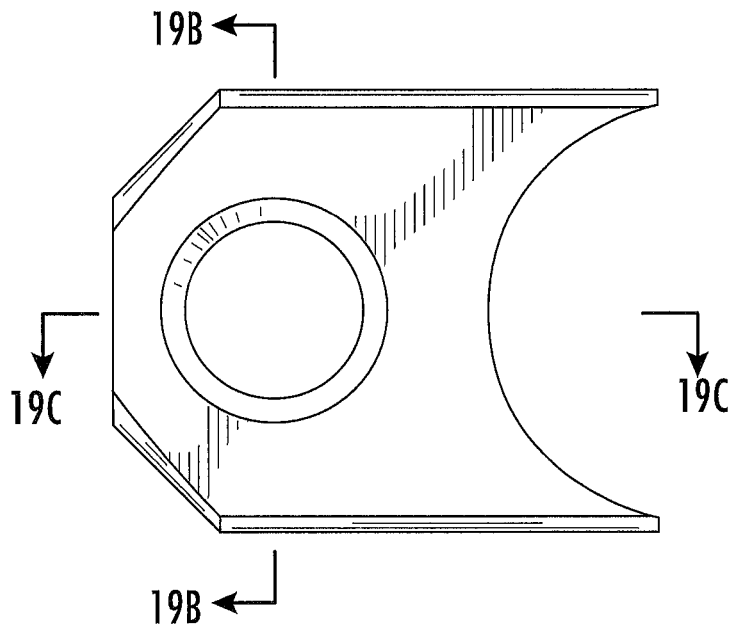
Figure 19B:
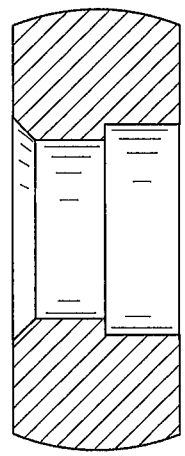
FIG. 19B—Depicts the biasing member in the section view.
Figure 19C:
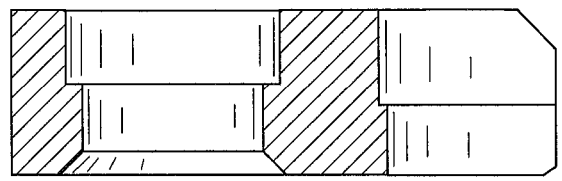
FIG. 19C—Depicts the biasing member in the section view.
Figure 19D:
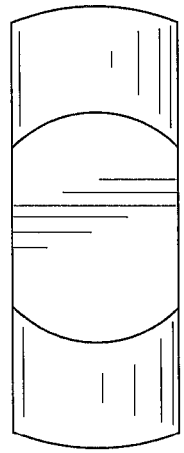
FIG. 19D—Depicts the biasing member in side view.
Figure 19E:
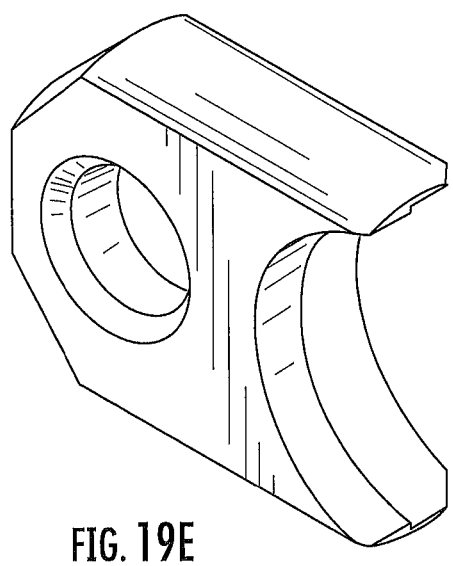
FIG. 19E—Depicts the biasing member in side view.
Figure 20A:
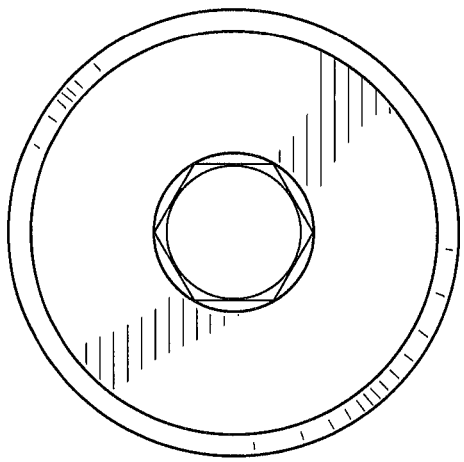
FIGS. 20A, 20B, 20C—Depict the retractable dowel pin which consists of a locating shoulder; drive feature (shown as a hex but may include other features) on either end, or both; threads; and O-ring. The retractable dowel pin, when screwed into a multi-purpose hole (defined as a bored plus threaded hole) provides exact location to a secondary object.
Figure 20B:
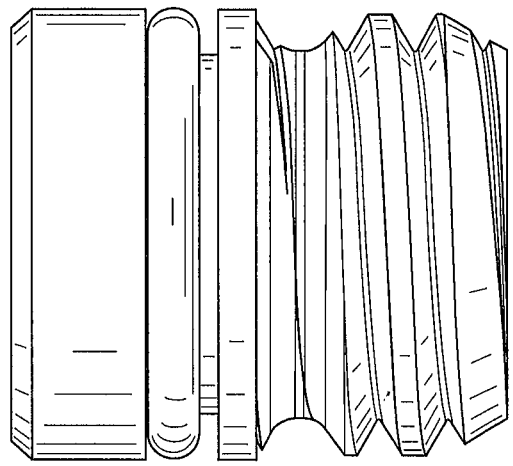
Figure 20C:
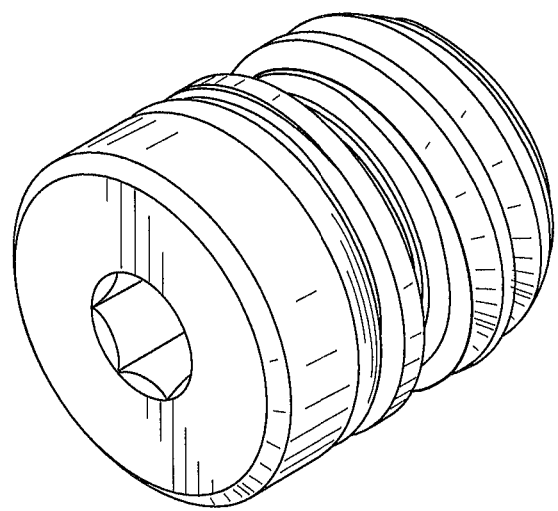
Figures 21A, 21B:
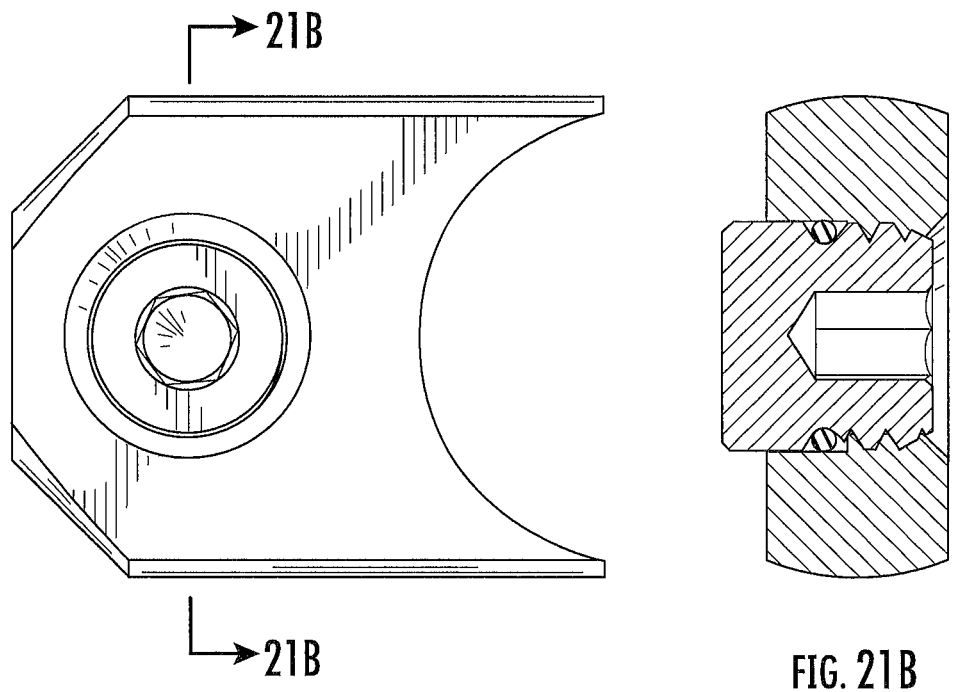
FIG. 21A—Depicts the assembled T-slot locator slider in top view.
FIG. 21B—Depicts the assembled T-slot locator slider in section view.
Figures 21C, 21D:
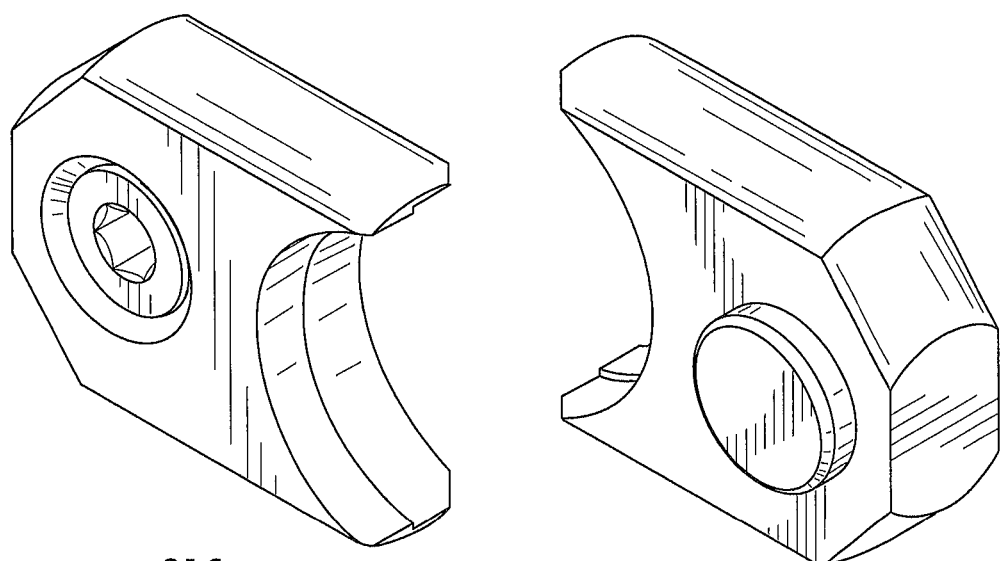
Figure 22A:
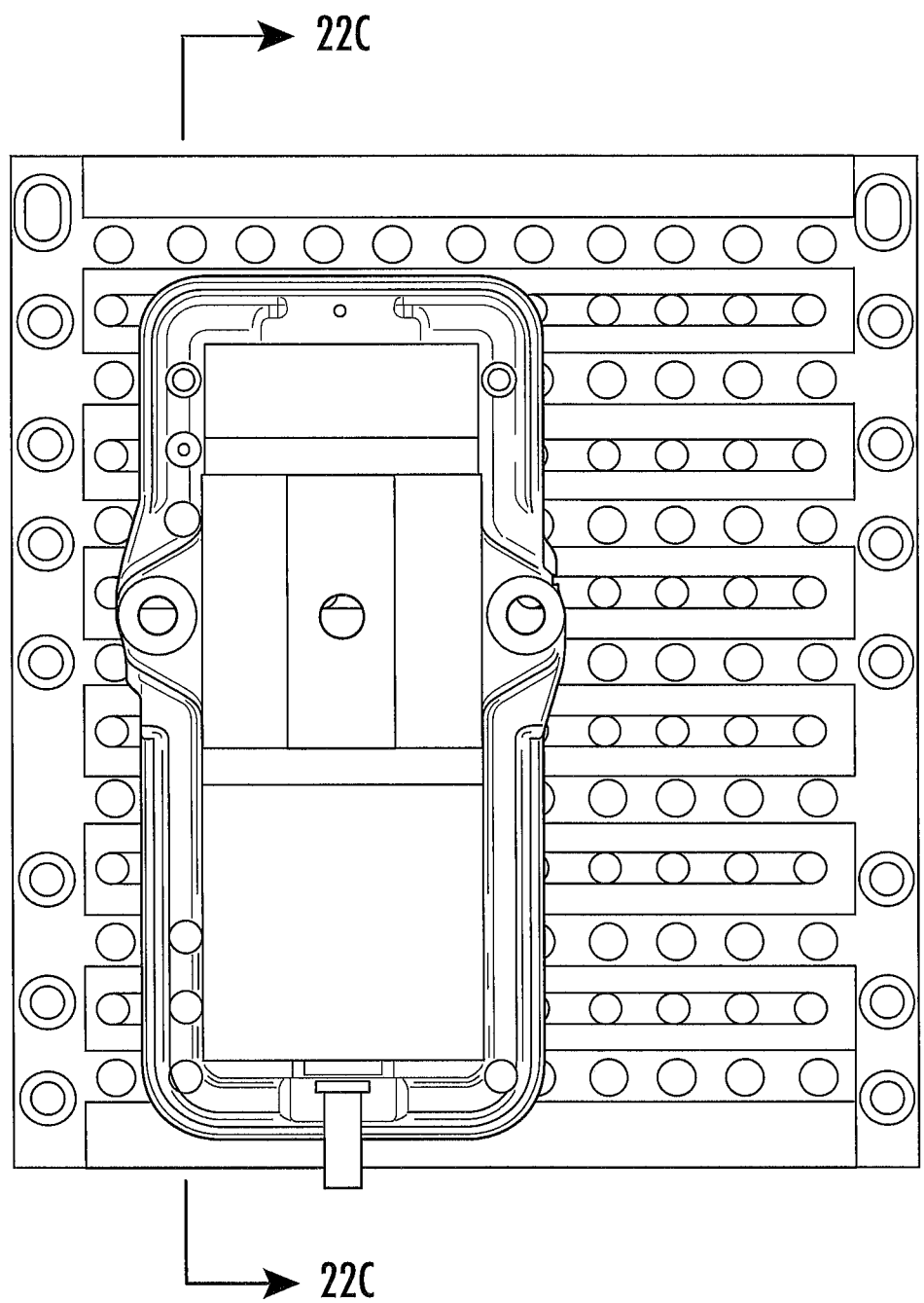
FIGS. 22A, 22B, 22C, 22D, 22E, 22F—Depict the assembled modular T-slot fixture incorporating the T-slot fastener and T-slot locator to locate/hold a vise product—Top View. This particular application facilitates the ability to rapidly, repeatably quick-change the vise on/off the T-slot fixture.
Figure 22F:
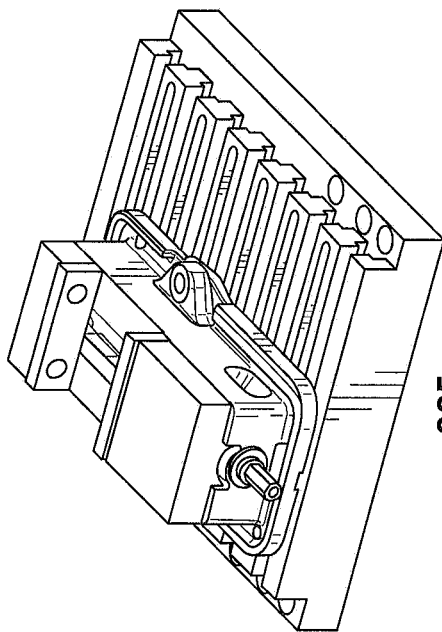
Figure 22B:
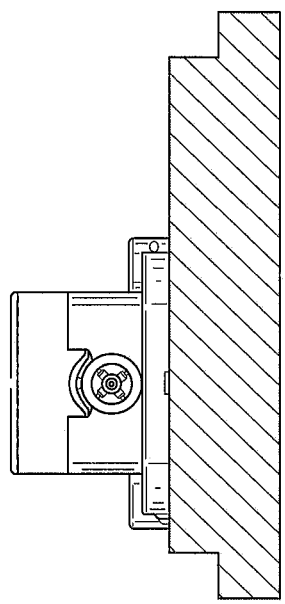
Figure 22C:
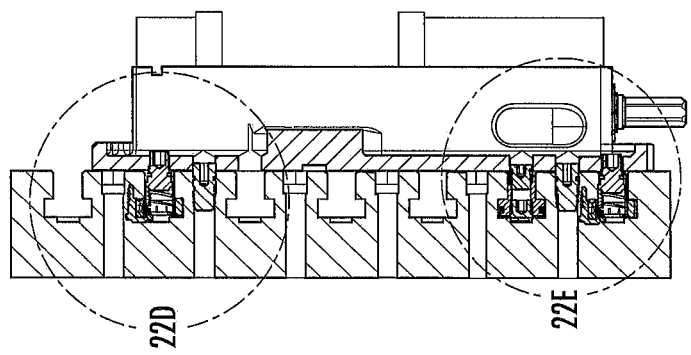
Figure 22D:
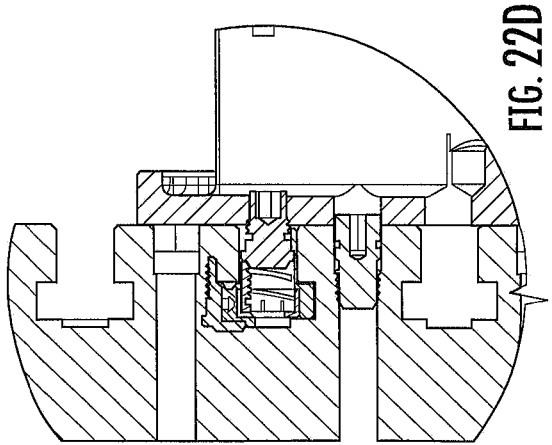
Figure 22E:
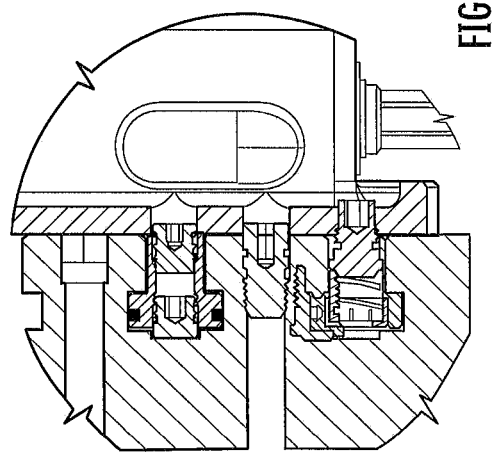

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined herein.

DETAILED DESCRIPTION

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The present application facilitates the use of baseplate T-slots directly by making a way to hold and locate other objects internal to the slot. This virtually eliminates the need for a sub-plate and also makes it possible to quick change vises directly on the T-slot baseplate. In addition, by virtue of the unique characteristics of these locating/holding products, a sub-plate fixture that incorporates T-slots (described herewith) can fulfill the specifications of a highly precise, quick-change modular fixture at lower cost than conventional methods.

The novel quarter turn fasteners and various embodiments (like the T-slot fastener) described herein are used in work-holding applications to create the means to quickly hold and release objects (like tooling, parts, and plates). One embodiment, the T-slot fastener, facilitates the creation of an entire workholding system that is novel and lower in cost than other solutions.

The quarter turn fastener design facilitates the rapid installation of the stud into the receiving member. The compact design also makes possible the ability to insert it into a device that can fit into a T-slot and still have considerable holding power.

The fastener device is self-contained and includes a unitary housing that is releasably fastened to the first object.

A release inset is pressed into the housing at the lower end of the housing. The fastener device also includes a threaded stud that is located within the housing. The stud includes an enlarged section which mates with the housing stop shoulder and serves to retain the stud within the housing when the fastener is in a fully engaged position. The stud is adapted to fit the release inset, which when turned one-quarter turn will bias out of the housing by use of a spring and fasten to the second object. The housing, stud, spring and release inset provide the basic functioning of the device. The capture inset and wiper provide additional features as described elsewhere in this document. The assembly of the fastener is implemented thus: the wiper is installed into the housing, then the capture inset is pressed into place to hold the wiper fast. The spring and stud combination are captured in the release inset and then pressed into the back of the housing.

This design can be incorporated into a device that uniquely works in a t-slot that when combined with specific characteristics of location and position, can perform the duties of a universal, flexible, modular fixture.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered, modified, and/or combined, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A fastener for use in a T-slot fixture, the fastener comprising:
   a housing having a central bore, a first internal flange, a second internal flange, and external flats configured to mate with the T-slot fixture;
   a stud slidingly received within the central bore, the stud having one or more external tabs and being operable between a retracted position in which the stud is disposed at least partially within the central bore and an extended position in which the stud extends out from a first end of the central bore, the stud being held within the central bore by the first internal flange of the housing;
   an inset installed at a second end of the central bore against the second internal flange, the inset including internal tangs for releasably capturing the external tabs of the stud;
   a spring disposed within the central bore for biasing the external tabs of the stud against the first internal flange of the housing;
   whereby the stud is engaged and disengaged from the retracted position and the extended position by a quarter turn of the stud.

* * * * *